United States Patent Office 3,364,146
Patented Jan. 16, 1968

3,364,146
POTASSIUM SALTS OF CHLORINATED CYANURIC ACIDS AND COMPOSITIONS CONTAINING SAME
Edward A. Casey and Raymond L. Liss, St. Louis, Mo., assignors to Monsanto Company, St. Louis, Mo., a corporation of Delaware
No Drawing. Continuation-in-part of application Ser. No. 802,025, Mar. 26, 1959, which is a continuation-in-part of application Ser. No. 693,816. This application Aug. 17, 1964, Ser. No. 390,170
5 Claims. (Cl. 252—99)

ABSTRACT OF THE DISCLOSURE

The present invention relates to certain potassium salts of chlorine substituted cyanuric acids, for example, monopotassium dichlorocyanurate, $KCl_2C_3N_3O_3$, and to bleaching, sterilizing and disinfecting compositions containing such salts. One anhydrous form of such potassium salt, referred to as Form I, is a white crystalline solid whose internal and external symmetry is monoclinic. Another anhydrous form, referred to as Form II, is a white crystalline solid whose internal symmetry is monoclinic but whose external symmetry is triclinic. Also described herein are stable formulations (useful for bleaching, sterilizing, etc.) which contain the above-designated potassium salts in combination with certain non-soap synthetic organic detergents such as a sodium alkyl benzene sulfonate, wherein the alkyl radical has from 8 to 22 carbon atoms, and/or certain inorganic detergent builder salts such as sodium tripolyphosphate, sodium silicate, and the like.

---

The novel products and compositions disclosed in this application were disclosed in part in our co-pending patent application, Ser. No. 802,025, filed Mar. 26, 1959 (now abandoned), and U.S. patent application Ser. No. 693,-816, filed Nov. 1, 1957 (now abandoned), said patent application Ser. No. 802,025 being a continuation-in-part of said patent application Ser. No. 693,816. The subject matter of the present application is to be taken in conjunction with the subject matter disclosed in said applications Ser. No. 693,816 and Ser. No. 802,025 and considered as a continuation-in-part of said applications.

The present invention relates to a class of novel compounds particularly suited for oxidizing, bleaching, sterilizing, disinfecting, etc. More specifically, the present invention relates to a class of novel compounds containing available chlorine which, upon dissolving in water, will release hypochlorite chlorine. The invention also relates to stable compositions of such compounds with neutral and alkaline inorganic compounds, particularly inorganic salts, which inorganic compounds are incapable of undergoing an oxidation-reduction reaction with the novel compounds of this invention. This invention also relates to stable compositions of such compounds with or without organic compounds—particularly organic compounds which are oxidizable in the presence of hypochlorite chlorine. The invention further relates to useful oxidizing, bleaching, sterilizing, disinfecting, and/or cleansing formulations, such as household laundry bleaches, dishwashing compositions, hospital disinfectants, sterilizing compositions, scouring powders, etc., containing the aforesaid novel chlorine compounds.

During the past few years there has been increased emphasis upon the development of so-called "solid bleach" formulations containing higher concentrations of available chlorine than can be obtained in liquid concentrates. Most of these formulations have been based upon an organic compound containing "positive" or "available" chlorine atoms, i.e., chlorine atoms which have replaced acidic hydrogen atoms—with the result that the compound will hydrolyze in aqueous solution to yield hypochlorite ion. Examples of such compounds include dichloramine T, dichlorodimethylhydantion, trichlorocyanuric acid, etc. One of the major difficulties with the foregoing type of formulation is the relative instability with respect to available chlorine, resulting in loss of chlorine and development of disagreeable odors upon storage, particularly at elevated temperatures.

There has been a desire to formulate oxidizing, sterilizing, bleaching, etc. formulations containing, in addition to the active chlorine compounds, a substantial proportion of organic materials such as organic dyes to promote customer acceptance, perfumes or other odor masking ingredients to make the decomposition products less noticeable, and surface active agents to promote foaming, wetting, and detergency, etc. However, the use of such organic compounds in formulations containing high concentration of available chlorine has been virtually impossible in the past, because the presence of even very small amounts of such organic compounds has caused almost immediate and total decomposition of the available chlorine compounds.

We have now discovered a class of dry crystalline solid compounds containing a high concentration of available chlorine and possessing a remarkable degree of stability, by itself or in combination with either inorganic or organic compounds. This novel class of compounds comprises the potassium salts of chlorine substituted cyanuric acids, i.e.

monopotassium dichlorocyanurate, $KCl_2C_3N_3O_3$,
dipotassium monochlorocyanurate, $K_2ClC_3N_3O_3$,
monopotassium monochloro hydrogen cyanurate,
$KClHC_3N_3O_3$, and mixtures thereof.

Of these new compounds monopotassium dichlorocyanurate is preferred. Depending upon the reaction temperature employed monopotassium dichlorocyanurate can be recovered in one of two anhydrous physical forms or mixtures thereof. For purposes of this invention, one anhydrous form will be called Form I and the other will be called Form II. Form I potassium dichlorocyanurate is a white crystalline solid whose internal and external symmetry is monoclinic. Form II potassium dichlorocyanurate is a white crystalline solid whose internal symmetry is monoclinic but whose external symmetry is triclinic. These anhydrous forms have the same X-ray diffraction pattern and both decompose without melting at about 230° C. They cannot be transformed into one another by heat treatment or exposure to surface moisture. When one molecular proportion of tripotassium cyanurate ($K_3C_3N_3O_3$) is reacted in an aqueous system with two molecular proportions of trichlorocyanuric acid ($Cl_3C_3N_3O_3$) anhydrous Form I separates from the reaction mass at temperatures above about 56° C. However, when one molecular proportion of tripotassium cyanurate is reacted with two molecular proportions of trichlorocyanuric acid in an aqueous system at a reaction temperature below about 52° C., the solid which precipitates is potassium dichlorocyanurate monohydrate (the water of hydration content of which being approximately 7 percent) which monohydrate on losing its water of hydration gives Form II potassium dichlorocyanurate. When reaction temperatures in the range of about 52° C. to 56° C. are employed, the separated solids are a mixture of Form I potassium dichlorocyanurate and potassium dichlorocyanurate monohydrate, which mass on drying to remove the water provides a mixture of the respective anhydrous forms, that is, a mixture of Form I and Form II. With respect to the monohydrate of potassium dichlorocyanurate which separates from a reaction mass obtained upon reacting tripotassium cyanurate and trichlorocyanuric acid in a 1:2 molar ratio in an aqueous system at temperature below about 52° C., this product is a white crystalline solid whose internal and external symmetry is triclinic and whose X-ray diffraction pattern is distinct from either that of Form I or Form II potassium dichlorocyanurate the patterns which as aforenoted being the same. This monohydrate of potassium dichlorocyanurate upon losing its water of hydration yields Form II potassium dichlorocyanurate. However, the dehydrated crystal maintains the same size and shape of the parent monohydrate. In other words, Form II potassium dichlorocyanurate is the pseudomorph of the monohydrate of potassium dichlorocyanurate.

In the preparation of dipotassium monochlorocyanurate, two molecular proportions of tripotassium cyanurate is reacted with one molecular proportion of trichlorocyanuric acid in an aqueous medium at about room temperature. Similarly monopotassium monochloro hydrogen cyanurate is prepared by reacting equimolecular proportions of dipotassium hydrogen cyanurate and dichloro hydrogen cyanuric acid ($Cl_2HC_3N_3O_3$) in an aqueous medium at about room temperature.

As illustrative of the preparation of the novel compounds of this invention is the following:

EXAMPLE 1

Tripotassium cyanurate was prepared by adding 500 grams of 50% potassium hydroxide to 334 grams of wet cyanuric acid (42.8% moisture) to form a thick slurry which was immediately diluted with water until the solids had completely dissolved. The resulting solution contained 12% by weight of tripotassium cyanurate. Four hundred and sixty-four grams of dry trichlorocyanuric acid were then added to two thousand twenty-eight grams of the 12% solution of tripotassium cyanurate, the addition being sufficiently slow to keep the temperature of the mixture below about 50° C. The mixture was cooled to about 5° C. and allowed to stand for about 30 minutes, during which time the monohydrate of potassium dichlorocyanurate precipitated from solution and settled to the bottom of the reaction mixture. The solids which contained 7 percent water of hydration were filtered and dried in an oven at 105° C. to remove the water of hydration. The dried product was a crystalline white solid which to the naked eye appeared to be of a hexagonal crystal structure, however, the crystals are in fact characterized by having a monoclinic internal symmetry and a triclinic external symmetry. This dried crystalline product has the same size and shape of the precipitated monohydrate. The dried product analyzed as follows:

Calculated: C, 15.52%; N, 17.79%; Cl, 30.08%; K (as sulfate), 36.92%. Found: C, 15.54%; N, 17.74%; Cl, 28.56%; K (sulfate), 36.39%.

For purposes of this invention this anhydrous salt is termed Form II potassium dichlorocyanurate.

X-ray diffraction analysis of the Form II potassium dichlorocyanurate so obtained revealed the following principal lines (relative intensities greater than 10%).

*Table I*

| Interplanar spacing: | Relative intensity |
| --- | --- |
| 12.099 | 22 |
| 11.840 | 23 |
| 5.941 | 16 |
| 3.966 | 11 |
| 3.672 | 31 |
| 3.630 | 17 |
| 3.616 | 13 |
| 3.463 | 17 |
| 3.302 | 100 |
| 3.209 | 11 |
| 3.073 | 11 |
| 3.002 | 11 |
| 2.974 | 14 |
| 2.782 | 33 |
| 2.710 | 13 |
| 2.618 | 13 |

EXAMPLE 2

Tripotassium cyanurate was prepared by adding 500 grams of 50% potassium hydroxide to 334 grams of wet cyanuric acid (42.8% moisture) to form a thick slurry which was immediately diluted with water until the solids had completely dissolved. The resulting solution contained 12% by weight of tripotassium cyanurate. Four hundred and sixty-four grams of dry trichlorocyanuric acid was then added to two thousand twenty-eight grams of the 12% aqueous solution of tripotassium cyanurate, the addition being sufficiently slow to keep the mixture in the range of 58–60° C. Upon completion of the trichlorocyanuric acid addition the mass is vacuum concentrated at about 60° C. so as to remove approximately 1000 grams of water. The precipitate which is Form I potassium dichlorocyanurate is then filtered off at about 60° C. and dried in an oven at 105° C. The dried solid is white crystalline Form I potassium dichlorocyanurate having a monoclinic internal and monoclinic external symmetry and has the appearance of flat plates. This anhydrous salt analyzes the same as Form II potassium dichlorocyanurate of Example 1 above and has the same X-ray diffraction pattern as Form II potassium dichlorocyanurate of Example 1 above.

The relative stability of the foregoing compounds will be readily apparent from the following example:

EXAMPLE 3

Samples of powdered (−140, +200 mesh) crystalline dichlorocyanuric acid, sodium dichlorocyanurate and Form II potassium dichlorocyanurate respectively were placed in open wide-mouthed bottles in a humidity cabinet and exposed to conditions alternating between 105° F. at 80% relative humidity and 95° F. at 90% relative humidity, each cycle being completed in 5⅓ hours. After 87 hours the samples were removed to determine the amount of available chlorine that had been lost. The results are set forth in the following Table II:

*Table II*

| Compound: | Loss of available chlorine after 87 hours, percent |
| --- | --- |
| Dichlorocyanuric acid | 4.7 |
| Sodium dichlorocyanurate | 14.1 |
| Form II potassium dichlorocyanurate | 0.2 |

As indicated earlier, the compounds of the present invention are also usually stable in the presence of neutral and alkaline inorganic compounds which are incapable of undergoing an oxidation-reduction reaction with the novel compounds of this invention. Examples of such inorganic compounds are phosphates, such as di and trisodium orthophosphates, sodium acid pyrophosphate, tetrasodium pyrophosphate, sodium tripolyphosphate, sodium metaphosphates, such as trimetaphosphates, hexametaphosphates, Graham's salts, etc.; silicates such as the meta, ortho, di and tetra silicates; carbonates; aluminates; sulfates; chlorides, oxides, etc. While the alkali and alkaline earth metal compounds, such as the sodium, potassium, lithium, calcium, barium, etc., analogues of the foregoing are the most commonly used compounds, it should be recognized that the polyvalent metal compounds, such as the aluminum, iron, titanium, etc., salts, oxides and the like can also be used in combination with the available chlorine compounds of this invention. Particularly advantageous inorganic compounds within the above-described classes of inorganic compounds are salts commonly known and referred to as inorganic alkali metal detergent builder salts.

The inorganic compounds used in combination with the novel chlorine compounds of this invention can be either water-soluble or water-insoluble, depending upon the particular purpose for which the combination is designed. For example, the water-soluble polyphosphate (including pyrophosphates) are often used as sequestering agents in bleaching formulations; the polyphosphates, silicates, carbonates and sulfates are often used as builders, corrosion inhibitors, diluents, etc., in detergent formulations. Insoluble compounds, such as dicalcium orthophosphate, calcium carbonate, calcium sulfate, titanium dioxide, silica, etc., may be used as abrasive agents as well as natural mineral abrasives such as talc, feldspar, etc., in scouring powders or other grinding or polishing formulations.

The stability of the potassium salts of the present invention, when used in combination with the various inorganic compounds such as mentioned above, is illustrated by the following examples.

EXAMPLE 4

Mechanical admixtures of 3.3% by weight of Form II potassium dichlorocyanurate or sodium dichlorocyanurate with potassium chloride were placed in sealed jars and exposed to temperature conditions cycling between 105° F. and 95° F. every 5⅓ hours. The degree of decomposition of the chlorine compounds after 65 hours is shown in the following Table III:

*Table III*

| Compound: | Loss of available chlorine after 65 hours, percent |
|---|---|
| Sodium dichlorocyanurate | 26.5 |
| Form II potassium dichlorocyanurate | 1.0 |

EXAMPLE 5

Mechanical admixtures of 3.3% by weight of sodium dichlorocyanurate or Form II potassium dichlorocyanurate with sodium carbonate were exposed to the same accelerated aging conditions described in Example 3 above. The amount of decomposition after 92 hours is shown in the following Table IV:

*Table IV*

| Compound: | Loss of available chlorine after 92 hours, percent |
|---|---|
| Sodium dichlorocyanurate | 41.7 |
| Form II potassium dichlorocyanurate | 23.2 |

EXAMPLE 6

Mechanical admixtures of 3.3% by weight of sodium dichlorocyanurate or Form II potassium dichlorocyanurate with anhydrous sodium metasilicate were placed in sealed jars and held in an oven at 136° F. The amount of decomposition of the respective chlorine compounds after 311 hours is set forth in the following Table V:

*Table V*

| Compound: | Loss of available chlorine after 311 hours, percent |
|---|---|
| Sodium dichlorocyanurate | 26.5 |
| Form II potassium dichlorocyanurate | 1.0 |

EXAMPLE 7

The procedure of Example 6 was duplicated, except that anhydrous sodium tripolyphosphate was used instead of sodium metasilicate. The results after 188 hours are summarized in the following Table VI:

*Table VI*

| Compound: | Loss of available chlorine after 188 hours, percent |
|---|---|
| Sodium dichlorocyanurate | 9.9 |
| Form II potassium dichlorocyanurate | 2.7 |

EXAMPLE 8

The procedure of Example 6 was duplicated except that sodium sulfate containing 5% moisture was substituted for the sodium metasilicate. The results after 45 hours are summarized in the following Table VII:

*Table VII*

| Compound: | Loss of available chlorine after 45 hours, percent |
|---|---|
| Sodium dichlorocyanurate | 94.0 |
| Form II potassium dichlorocyanurate | 22.5 |

As pointed out before, the potassium salts of the chlorinated cyanuric acids of this invention are also unique in their outstanding stability in the presence of organic compounds. This property is particularly useful in that it facilitates the use of available chlorine containing compounds in formulations which can also contain perfumes or odor-masking agents such as the "essential oils" or various components thereof; organic sequestering and chelating agents such as the metal salts of ethylene diamine tetra-acetic acid; organic dyes and coloring agents such as those described in Venkataraman, "Chemistry of Synthetic Dyes," Academic Press, Inc., New York (1952), organic stain, corrosion, or tarnish inhibitors such as those described in U.S. Patents 2,618,603 and 2,618,615; surface active agents such as foaming agents, emulsifiers, detergents, etc.

In this latter category there can be included the anionic surfactants, (such as the sulfated and sulfonated alkyl, aryl, and alkylaryl hydrocarbons set forth in U.S. 2,846,-398, line 54 of column 3 to line 6 of column 5, thereof) the nonionic surfactants (such as those set forth in U.S. 2,846,398; column 5, thereof) and the cationic surfactants. The portion of U.S. Patent 2,846,398 relating to certain preferred organic surface active agents which have been found to be particularly advantageous in the compositions of this invention appears in column 4, lines 35 to 75 and column 5, lines 1 to 74 and are quoted below.

"The organic anionic detergents of this invention include in addition to the preferred alkali metal fatty acid soaps the well known surface-active alkali metal sulfonates and sulfates, which may be employed as the sole detergent base or in admixture with the alkali metal fatty acid soaps (e.g. one part of the fatty acid soap to 0.5 to 2 parts by weight of the surface-active alkali metal sulfonate or sulfate or mixture thereof) as the detergent base. A preferred group of this class is the long chain alkyl aryl sulfonates, i.e. those wherein the alkyl radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower monoolefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

"Other sulfonate surface-active agents are contemplated also, e.g. the long chain alkyl sulfonates such as sodium hexadecane sulfonate and sodium octadecane sulfonate.

"The well known sulfate detergents having 12 to 26 carbon atoms and particularly those having an acyl radical of about 8 to 22 carbon atoms may be employed as anionic detergent bases in accordance with this invention. Such detergents include the sulfuric acid esters of polyhydric alcohols incompletely esterified with fatty acid, e.g. sodium cocoanut oil monoglyceride monosulfate, sodium tallow diglyceride monosulfate, the pure and mixed higher alkyl sulfates such as sodium lauryl sulfate and sodium cetyl sulfate.

"Additional anionic surface-active sulfonates and sulfates contemplated by this invention are the sulfated and sulfonated alkyl acid amides such as Igepon T $$(C_{17}H_{33}CO \cdot NHCH_2CH_2SO_3Na)$$

the sulfated and sulfonated esters such as Igepon AP (RCOOCH$_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium sulfosuccinic esters such as NaOOCCH$_2$CH(SO$_3$Na)CONHC$_{18}$H$_{37}$ and the like. To illustrate the activity of the polyhalogen substituted carbanilides of this invention when admixed with these anionic detergents is the following:

"A. 10 parts by weight of a sodium alkyl benzene sulfonate surface-active agent containing the alkyl radical an average of about 12 carbon atoms is dissolved in 190 parts by weight of water and thereto is added an alcohol solution containing 0.1 part by weight of 3,4,4'-trichlorocarbanilide and 10 parts ethanol.

"B. 10 parts by weight of a sodium alkyl benzene sulfonate surface-active agent containing in the alkyl radical an average of about 10 carbon atoms is dissolved in 190 parts by weight of water and thereto is added an alcohol solution containing 0.1 part by weight of 3,4,4'-trichlorocarbanilide and 10 parts ethanol.

"Aliquots of the respective compositions A and B were added to a nutrient agar medium so as to give a concentration of 1, 0.5 and 0.10 p.p.m. of 3,4,4'-trichlorocarbanilide. The agar in each case was then poured into a Petri dish, allowed to harden and then inoculated with a standard culture of *Micrococcus pyrogenes* var. Aureus of standard resistance. The incubation in each instance was made at 37° C. for 48 hours and the extent of growth is noted below:

| Composition/Concentration of 3,4,4'-trichlorocarbanilide | 1 p.p.m. | 0.5 p.p.m. | 0.10 p.p.m. |
| --- | --- | --- | --- |
| A | None | None | None. |
| B | do | do | Do. |

"In addition to the anionic surface-active agents the nonionic surface-active agents containing a polyhalogen substituted carbanilide of this invention provides antiseptic compositions. The nonionic surface-active agents contemplated are viscous liquid to wax-like water-soluble surface-active substances containing a polyglycol ether group of the structure

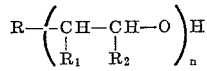

wherein R$_1$ and R$_2$ are hydrogen or short chain alkyl, where $n$ is an integer greater than 3, and where R is a residue of a compound of a monomeric organic compound having an active hydrogen, e.g., alcohols, phenols, amides, primary amines, secondary amines, carboxylic acids, etc. These nonionic detergents are well known (note U.S. 1,970,578 and U.S. 2,213,477) and may be typified by the polyalkylene oxide derivatives (i.e., polyethylene oxide, polypropylene oxide, polybutylene oxide) of water-insoluble higher fatty acids, such as lauric, oleic, palmitic and stearic acid and the like of mixtures thereof, such as the mixtures of fatty acids obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e., the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl-phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful nonionic detergent is that obtained by condensing one mol of tall oil with 5 to 15 mols of ethylene oxide."

Other typical examples of these various categories of surfactants are described in Schwartz and Perry, "Surface Active Agents," Interscience Publishers, New York (1949) and Journ. Am. Oil Chemists Society, volume 34, No. 4, pages 170–216 (April 1957). In order to avoid unnecessary enlargement of this specification, the subject matter disclosed in these references is incorporated herein by reference.

The outstanding stability of the novel compounds of this invention, when used in conjunction with organic materials, is demonstrated by the following example:

EXAMPLE 9

A mixture of 3.3% by weight of Form II potassium dichlorocyanurate, 94.7% by weight of silica and 2% by weight of the condensation product of oxo-tridecyl alcohol with about 9 molar proportions of ethylene oxide was placed in an open jar maintained at 136° F. for 165 hours. A similar mixture containing sodium dichlorocyanurate instead of Form II potassium dichlorocyanurate was exposed to the same conditions. The relatively greater stability of the potassium salt is shown by the following Table VIII:

*Table VIII*

Loss of available chlorine
Compound: after 165 hours, percent
Sodium dichlorocyanurate _____ 75
Form II potassium dichlorocyanurate _____ 26

EXAMPLE 10

The procedure of Example 9 was duplicated except that oil of wintergreen was substituted for the condensation product of the alcohol and ethylene oxide. The results are set forth in the following Table IX:

*Table IX*

Loss of available chlorine
Compound: after 165 hours, percent
Sodium dichlorocyanurate _____ 88.0
Form II potassium dichlorocyanurate _____ 25.5

EXAMPLE 11

A mixture of 3.3% by weight of potassium dichlorocyanurate, 94.3% by weight of silica and 2.4% by weight of sodium dodecylbenzenesulfonate (85% active) was exposed in an open wide-mouthed bottle to temperature and humidity conditions cycling between 105° F. at 80% relative humidity and 95° F. at 90% relative humidity every 5⅓ hours. A similar mixture containing sodium dichlorocyanurate instead of Form II potassium dichlorocyanurate was similarly exposed. The results of these tests are summarized in the following Table X:

*Table X*

Loss of available chlorine
Compound: after 69 hours, percent
Sodium dichlorocyanurate _____ 7.0
Form II potassium dichlorocyanurate _____ 3.4

EXAMPLE 12

The procedure of Example 10 was duplicated except that the sodium salt of ethylene diamine tetra-acetic acid was substituted for oil of wintergreen. Results are set forth in the following Table XI:

*Table XI*

Loss of available chlorine
Compound: after 165 hours, percent
Sodium dichlorocyanurate _____ 7.3
Form II potassium dichlorocyanurate _____ 0.0

The concentration of potassium salts of the present invention to be utilized in any particular formulation will depend largely upon the specific use for which the formulation is designed and usually will be in the range of about 0.1 to about 98% by weight of the formulation or mixture. For example with strong sterilizing, oxidizing, disinfecting or bleaching compositions the present potassium salts may comprise a predominant proportion (e.g. up to 90% or 95% or more) of the formulation. In formulations designed for ultimate consumer use (e.g. household formulations such as laundry bleaches, scouring powders, etc.), considerably smaller proportions of the potassium salts will be used. For example, in a household laundry bleach between about 5% and about 20% by weight of the present potassium salts will generally be suitable; with scouring powders as little as 0.1% is often sufficient; with dishwashing compositions between about 1% and about 10% is satisfactory.

Although the novel compositions of this invention are remarkably stable in comparison with previously known chlorine compositions containing high concentrations of available chlorine, there is still a need to exercise some discretion in the formulation of these compounds in conjunction with organic compounds. Thus, for example, when the present potassium salts are formulated with organic compounds it will generally be desirable to include in such formulations a predominant proportion (i.e. at least 50% by weight of the total formulation) of an alkaline or neutral inorganic compound such as for example an inorganic alkali metal detergent builder salt hereinbefore described to act as an inert diluent for the combination of organic compounds and available chlorine containing compound either of which latter two being present in amounts as little as 0.1% of the total formulation. In general it will be preferable to keep the combined total concentration of organic compound and available chlorine containing compound at a value below about 10% by weight of the total formulation.

As further typical illustrations of useful compositions utilizing the novel potassium salts of the present invention there is presented herewith the following typical specific formulations:

TYPICAL HOUSEHOLD LAUNDRY BLEACH

| | Weight percent |
|---|---|
| Sodium tripolyphosphate | 40 |
| Sodium sulfate | 24 |
| Sodium metasilicate | 20 |
| Sodium dodecylbenzenesulfonate | 5 |
| Potassium silicate | 1 |
| Potassium dichlorocyanurate (Form I or Form II or mixture thereof) | 10 |

TYPICAL SANITIZING COMPOSITION

| | Weight percent |
|---|---|
| Sodium sulfate | 25 |
| Sodium tripolyphosphate | 20 |
| Tetrasodium pyrophosphate | 20 |
| Sodium metasilicate | 5 |
| Potassium dichlorocyanurate (Form I or Form II or mixture thereof) | 20 |

TYPICAL SCOURING POWDER

| | Weight percent |
|---|---|
| Silica | 90 |
| Sodium tripolyphosphate | 5 |
| Soda ash | 2.5 |
| Sodium lauryl sulfate | 2.2 |
| Potassium dichlorocyanurate (Form II) | 0.3 |

TYPICAL DISHWASHING FORMULATION
(For automatic dishwasher)

| | Weight percent |
|---|---|
| Sodium tripolyphosphate | 40 |
| Sodium sulfate | 22 |
| Sodium metasilicate | 22 |
| Soda ash | 7 |
| Dipotassium monochlorocyanurate | 2 |

What is claimed is:

1. A sterilizing, disinfecting, oxidizing and bleaching composition consisting essentially of a mixture of (a) crystalline, anhydrous monopotassium dichlorocyanurate having a monoclinic internal symmetry and a monoclinic external symmetry and (b) an inorganic compound selected from the group consisting of silica and alkali metal phosphates, silicates, sulfates, carbonates, aluminates, chlorides, and mixtures thereof, said monopotassium dichlorocyanurate being present in an amount in the range of from about 0.1% to about 98% by weight of said mixture, said inorganic compound being further characterized as incapable of undergoing an oxidation-reduction reaction with respect to said monopotassium dichlorocyanurate.

2. A sterilizing, disinfecting, oxidizing and bleaching composition consisting essentially of (a) crystalline anhydrous monopotassium dichlorocyanurate having a monoclinic internal symmetry and a monoclinic external symmetry and (b) a non-soap synthetic organic detergent selected from the group consisting of non-soap synthetic anionic surface active agents and non-soap synthetic nonionic surface active agents, said monopotassium dichlorocyanurate being present in an amount in the range of from about 0.1% to about 98% by weight of said mixture, said organic detergent being further characterized as incapable of undergoing an oxidation-reduction reaction with respect to said monopotassium dichlorocyanurate.

3. A sterilizing, disinfecting, oxidizing and bleaching composition consisting essentially of (a) from about 50% to about 98% by weight, based on the weight of the composition, of an inorganic compound selected from the group consisting of silica and alkali metal phosphates, silicates, sulfates, carbonates, aluminates, chloride and mixtures thereof; (b) a non-soap synthetic organic detergent selected from the group consisting of non-soap synthetic anionic surface active agents and non-soap synthetic nonionic surface active agents; and (c) a crystalline anhydrous monopotassium dichlorocyanurate having a monoclinic internal symmetry and a monoclinic external symmetry; the total weight of (b) and (c) being from about 0.1% to about 10% based on the total weight of the composition, said inorganic compound and said organic detergent being both further characterized as incapable of undergoing an oxidation-reduction reaction with respect to said monopotassium dichlorocyanurate.

4. The composition as set forth in claim 3 wherein said non-soap synthetic organic detergent is a sodium alkyl benzene sulfonate wherein the alkyl radical contains 8 to 22 carbon atoms, and said inorganic compound is a mixture of sodium tripolyphosphate, sodium sulfate, and sodium metasilicate.

5. The composition as set forth in claim 3 wherein the inorganic compound is a mixture of silica, sodium tripolyphosphate and soda ash, and the anionic surface active agent is a sodium alkyl benzene sulfonate wherein the alkyl radical has a straight chain containing from 10 to 16 carbon atoms.

References Cited

UNITED STATES PATENTS

| 2,607,738 | 8/1952 | Hardy | 252—98 |
| 2,815,311 | 12/1957 | Ellis et al. | 252—187 |
| 2,897,154 | 7/1959 | Low | 252—99 |
| 2,913,460 | 11/1959 | Brown et al. | 260—248 |
| 2,921,911 | 1/1961 | Staubly | 252—187 |

FOREIGN PATENTS 551,308  3/1957  Belgium.

LEON D. ROSDOL, Primary Examiner.

M. WEINBLATT, Assistant Examiner.